US009016672B2

(12) United States Patent
Englund et al.

(10) Patent No.: US 9,016,672 B2
(45) Date of Patent: Apr. 28, 2015

(54) HANDHELD WORKING TOOL (75) Inventors: Thomas Englund, Gothenburg (SE);
Pär Martinsson, Jönköping (SE)

(73) Assignee: Husqvarna AB, Huskvarna (SE)

( * ) Notice: Subject to any disclaimer, the term of this patent is extended or adjusted under 35 U.S.C. 154(b) by 282 days.

(21) Appl. No.: 13/503,431

(22) PCT Filed: Oct. 23, 2009

(86) PCT No.: PCT/SE2009/051210
§ 371 (c)(1),
(2), (4) Date: Apr. 23, 2012

(87) PCT Pub. No.: WO2011/049496
PCT Pub. Date: Apr. 28, 2011

(65) Prior Publication Data
US 2012/0204431 A1 Aug. 16, 2012

(51) Int. Cl.
F16M 1/00 (2006.01)
B27B 17/02 (2006.01)
(Continued)

(52) U.S. Cl.
CPC . *B25F 5/006* (2013.01); *F16F 1/37* (2013.01);
*F16F 1/3732* (2013.01); *F16F 1/377*
(2013.01); *F16F 3/10* (2013.01); *F16F 15/022*
(2013.01)

(58) Field of Classification Search
USPC ......... 30/383, 181, 386–389, 520; 267/141.1,
267/141.3, 137, 136; 173/162.2; 123/192.2
See application file for complete search history.

(56) References Cited

U.S. PATENT DOCUMENTS 3,845,557 A * 11/1974 Bailey .............................. 30/381
4,138,812 A * 2/1979 Zimmerer et al. .............. 30/381
(Continued)

FOREIGN PATENT DOCUMENTS

CN 1644957 A 7/2005
CN 1943995 A 4/2007
(Continued)

OTHER PUBLICATIONS

International Search Report and Written Opinion of PCT/SE2009/051210 mailed Jun. 2, 2010.
(Continued)

Primary Examiner — Omar Flores Sanchez
(74) Attorney, Agent, or Firm — Nelson Mullins Riley & Scarborough LLP (57) ABSTRACT The present invention concerns a handheld working tool comprising a motor part (10), a handle part (20) comprising a handle grip (21), and at least one first type antivibration element (30) arranged between said motor part (10) and said handle part (20), and which element (30) is adapted to isolate the handle part (20) from vibrations in the motor part (10). The working tool (1) is characterized in that it further comprises at least one second type antivibration element (40) arranged adjacent to the first type antivibration element (30). The at least one second type antivibration element (40) is adapted to, when in an active state, prevent vibrations in the motor part (10) from being transferred to the handle grip (21). The second antivibration element (40) is in the active state when the handle grip (21) is loaded during operation of the working tool (1). The working tool is further characterized in that a longitudinal axis (L1) of the second type antivibration element (40) is separated from a longitudinal axis (L2) of the first type antivibration element (30).

16 Claims, 5 Drawing Sheets (51) Int. Cl.
  B25D 17/00   (2006.01)
  B25F 5/00    (2006.01)
  F16F 1/37    (2006.01)
  F16F 1/373   (2006.01)
  F16F 1/377   (2006.01)
  F16F 3/10    (2006.01)
  F16F 15/02   (2006.01)

(56) References Cited

U.S. PATENT DOCUMENTS

| | | | |
|---|---|---|---|
| 4,282,938 A * | 8/1981 | Minamidate | 173/162.2 |
| 5,046,566 A * | 9/1991 | Dorner et al. | 173/162.2 |
| 5,447,295 A * | 9/1995 | Taomo | 267/153 |
| 5,960,549 A | 10/1999 | Hoppner | |
| 6,375,171 B1 * | 4/2002 | Zimmermann et al. | 267/137 |
| 6,446,421 B1 * | 9/2002 | Kramer et al. | 56/233 |
| 6,643,939 B2 * | 11/2003 | Tajima et al. | 30/381 |
| 6,799,642 B2 * | 10/2004 | Wolf et al. | 173/162.2 |
| 6,994,068 B2 | 2/2006 | Menzel et al. | |
| 7,152,853 B2 * | 12/2006 | Menzel et al. | 267/137 |
| 7,836,971 B2 * | 11/2010 | Kikuchi et al. | 173/162.1 |
| 8,002,094 B2 * | 8/2011 | Ruebsamen et al. | 188/379 |
| 8,226,066 B2 * | 7/2012 | Kubat et al. | 248/634 |
| 8,672,305 B2 * | 3/2014 | Wolf et al. | 267/141.2 |
| 2003/0188618 A1 * | 10/2003 | Menzel et al. | 83/801 |
| 2004/0178551 A1 * | 9/2004 | Menzel et al. | 267/141 |
| 2004/0244207 A1 * | 12/2004 | Menzel et al. | 30/381 |
| 2005/0011714 A1 * | 1/2005 | Menzel et al. | 188/380 |
| 2005/0035511 A1 | 2/2005 | Friedrich et al. | |

FOREIGN PATENT DOCUMENTS

| | | |
|---|---|---|
| GB | 2404609 A | 2/2005 |
| JP | 57146936 A | 9/1982 |

OTHER PUBLICATIONS

Chapter I International Preliminary Report on Patentability of PCT/SE2009/051210 mailed Apr. 24, 2012.

* cited by examiner

HANDHELD WORKING TOOL

TECHNICAL FIELD

This invention relates to handheld working tools with antivibration elements.

BACKGROUND

In handheld working tools comprising antivibration elements, there is often a compromise between a low amount of vibrations in the handle grip and good manageability. In chain saws, a handle part of the saw is isolated from vibrations in a motor part through a plurality of spring elements attached between the two parts. To do this effectively, the springs are made as soft as possible. However, with soft springs the manageability during operation is degraded and the chain saw becomes difficult to accurately work with.

One way of improving the vibration isolation effect is presented in U.S. Pat. No. 6,994,068. It discloses an antivibration device in a handheld working tool with an antivibration element mounted between a motor unit and a vibration-insulated unit. The antivibration element comprises a spring element attached to one of the two units, and an element of foamed elastic material having a plurality of radially projecting ribs in contact with the other of the two units. The elastic material element provides improved stabilization when active, but at the same time are the vibrations in the vibration-insulated unit increased. The vibrations in the vibration-insulated unit may be decreased by the spring element when the elastic material element is not active. This solution only slightly improves the manageability, and that is at the sacrifice of the vibration isolation.

It is wishful to provide a working tool with antivibration elements that both effectively isolates vibrations between the two parts of the working tool, and improves the manageability during operation.

SUMMARY

It is an object of the present invention to provide a working tool, such as a chain saw, wherein the handle grip during operation is isolated from vibrations and at the same time provides good manageability. This is achieved with a handheld working tool according to the appended independent claim. Embodiments of the invention are presented in the dependent claims, as well as in the following description and drawings.

According to the present invention, a handheld working tool is provided, comprising a motor part, a handle part comprising a handle grip, and at least one first type antivibration element arranged between said motor part and said handle part, and which element is adapted to isolate the handle part from vibrations in the motor part. The working tool is characterized in that it further comprises at least one second type antivibration element arranged adjacent to the first type antivibration element. The at least one second type antivibration element is adapted to, when in an active state, prevent vibrations in the motor part from being transferred to the handle grip. The second antivibration element is in the active state when the handle grip is loaded during operation of the working tool. The working tool is further characterized in that a longitudinal axis of the second type antivibration element is separated from a longitudinal axis of the first type antivibration element.

This working tool has the advantage of improved manageability during heavy load on the handle grip, with kept good vibration isolation between the motor part and the handle part both with and without load on the handle grip. The good vibration isolation may be provided by extra soft spring elements in the first type antivibration elements. By only providing softer spring elements, the manageability is affected negatively. In the present invention, the second type antivibration element may prevent vibrations in the motor part from being transferred to the handle grip when the handle grip is loaded, and at the same time provide a resilient effect that is equivalent to the resilient effect of a stiff spring element, resulting in improved manageability. Thereby, the isolation function in the first type antivibration elements may be improved by providing them with softer springs, and the manageability of the working tool during operation may still be satisfactory thanks to the second type antivibration element. The first type antivibration elements may also have lower weight than in prior solutions.

The second type antivibration element may in one embodiment be arranged with its longitudinal axis substantially in parallel with a longitudinal axis of the first type antivibration element.

The two elements may be arranged between the handle part and the motor part adjacent to each other. When arranged adjacent to each other and in parallel, the second type element functions as a progressive complement to the first element when the handle grip is loaded.

In one embodiment the first type antivibration element is a spring element.

The spring elements for isolation of the handle part from vibrations in the motor part may be adjusted in stiffness for a satisfactory function. A softer spring in the at least one first type antivibration elements provides better vibration isolation to the handle part, and with the function of the second type antivibration element may a good manageability of the working tool be preserved.

In one embodiment, the second type antivibration element may comprise a damping element which may be surrounded by a housing. The damping element may further be arranged to be pressed against a portion of the housing wall when the second type antivibration element is in the active state, that is when the handle grip is loaded.

The active state of the second type antivibration element is defined by the load on the handle grip during operation. When the handle grip is loaded the damping element of the second type antivibration element may be pressed against a portion of the housing wall. The damping element may be attached to the handle part of the working tool, and the housing may be formed in the motor part, and thereby the second type antivibration element may provide, in the active state, vibration isolation between the parts as a complement to the first type antivibration elements. The resilient effect in the damping element may be equivalent to the resilient effect of a stiff spring. Thereby, a good manageability of the working tool may be provided even with soft springs in the first type antivibration elements, since a stiff resilient effect may be provided by the second type antivibration element when the handle grip is loaded.

The damping element of the second type antivibration element may in one embodiment of the invention be attached to the handle part. In that case the housing of the second type antivibration element may be formed in the motor part, surrounding the damping element. In an alternative embodiment, the damping element may be attached to the motor part, and the corresponding housing may then be formed in the handle part.

The second type antivibration element may be in an active state when the handle grip is loaded. The element may further in an embodiment be in a non-active state when the handle grip is not loaded. In the non-active state, the damping element may not be pressed against the surrounding housing wall, and may therefore be free from contact with the housing. Since there may not be any contact between the damping element and the housing when in the non-active state, there may not be any contact between the handle part and the motor part through the second type antivibration element and no vibration isolation or stabilization may be provided by that element. A progressive function may be provided in the second type antivibration element when the handle grip is getting loaded and the second type antivibration element may change from the non-active state to the active state. The definition of no loads on the handle grip may in the present invention include small loads, i.e. the second type antivibration element may still be in the non-active state, with no contact between the damping element and the housing, when there is only small load on the handle grip. The loaded handle grip, i.e. the second type antivibration element is in the active state, may include loads larger than the loads included for the non-active state.

The damping element may in one embodiment provide a substantially circular peripheral surface. Thereby the element may form a continuous surface facing a correspondingly shaped housing. A continuous surface towards the housing provides large contact surface between the damping element and the housing. An advantage with large contact surface is that problems with wear of the damping element are reduced. The shape of the housing may be round, corresponding to the shape of the damping element. Further, the housing may instead provide a substantially elliptical shape surrounding the damping element. This provides different distances between the damping element and the housing wall in different directions. Further, the housing may be in another shape.

In one embodiment, the damping element may be provided with a plurality of cavities. In a further embodiment, the plurality of cavities may be provided in parallel with the longitudinal axis of the second type antivibration element. By providing the damping element with cavities in a longitudinal direction, the stiffness in the resilient effect of the damping element may be controlled. A part of the damping element, in a radial direction, provided with the cavities may provide a softer resilient effect than a part closer to the center of the damping element. This provides progressive vibration isolation when the damping element is pressed against a portion of the housing wall.

The damping element in the second type antivibration element may in one embodiment comprise an elastic material. The elastic material may be the portion of the damping element that may be pressed against the housing wall when the second type antivibration element is in the active state.

In a further embodiment, the elastic material in the damping element may be foamed polyurethane, rubber or the like.

In one embodiment, the working tool may further comprise a cutting bar attached to a portion of the motor part. The first and the second type antivibration elements may be arranged at a portion of the handle part adjacent to said portion of the motor part.

The vibrations in the working tool are mainly generated in the motor part and in the cutting bar. The vibration isolation effect of the second type antivibration element has been seen to be more effective when the second type antivibration element is arranged close to the cutting bar. This improves the manageability of the working tool when the handle grip is loaded.

In one embodiment, the vibration isolation effect of the second type antivibration element may be improved further by arrangement of the second type antivibration element on the same side of a longitudinal axis of the working tool as the portion of the motor part wherein the cutting bar is attached.

In a further embodiment the second type antivibration element may be arranged further away from the longitudinal axis of the working tool than the first type antivibration element. Thereby, the manageability during load on the handle grip is further improved.

The working tool may in one embodiment further comprise a compression stop adapted to set a maximum compression level of the damping element when the damping element is pressed against the housing wall. If the damping element is compressed too much while pressed against the housing wall when in the active state, the material in the damping element may be damaged. If damaged the damping element may suffer from reduced vibration isolation properties. The compression stop may prevent the damping element from being compressed too much.

In a further embodiment the thickness of the damping element may be reduced to no less than 30% of the thickness in the non-active state when the damping element is pressed to the maximum compression level against the housing wall. Thereby the level of maximum compression of the damping element may not damage the damping element. Depending on the arrangement of the second antivibration element the compression stop may prevent further compression of the damping element.

Good manageability is here meant as that the working tool does not feel limp to work with, such as if it would turn around a longitudinal direction of the cutting bar when the handle grip is loaded.

BRIEF DESCRIPTION OF THE DRAWINGS

In the following, an embodiment will be described in more detail with reference to the accompanying drawings.

DESCRIPTION OF EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1:
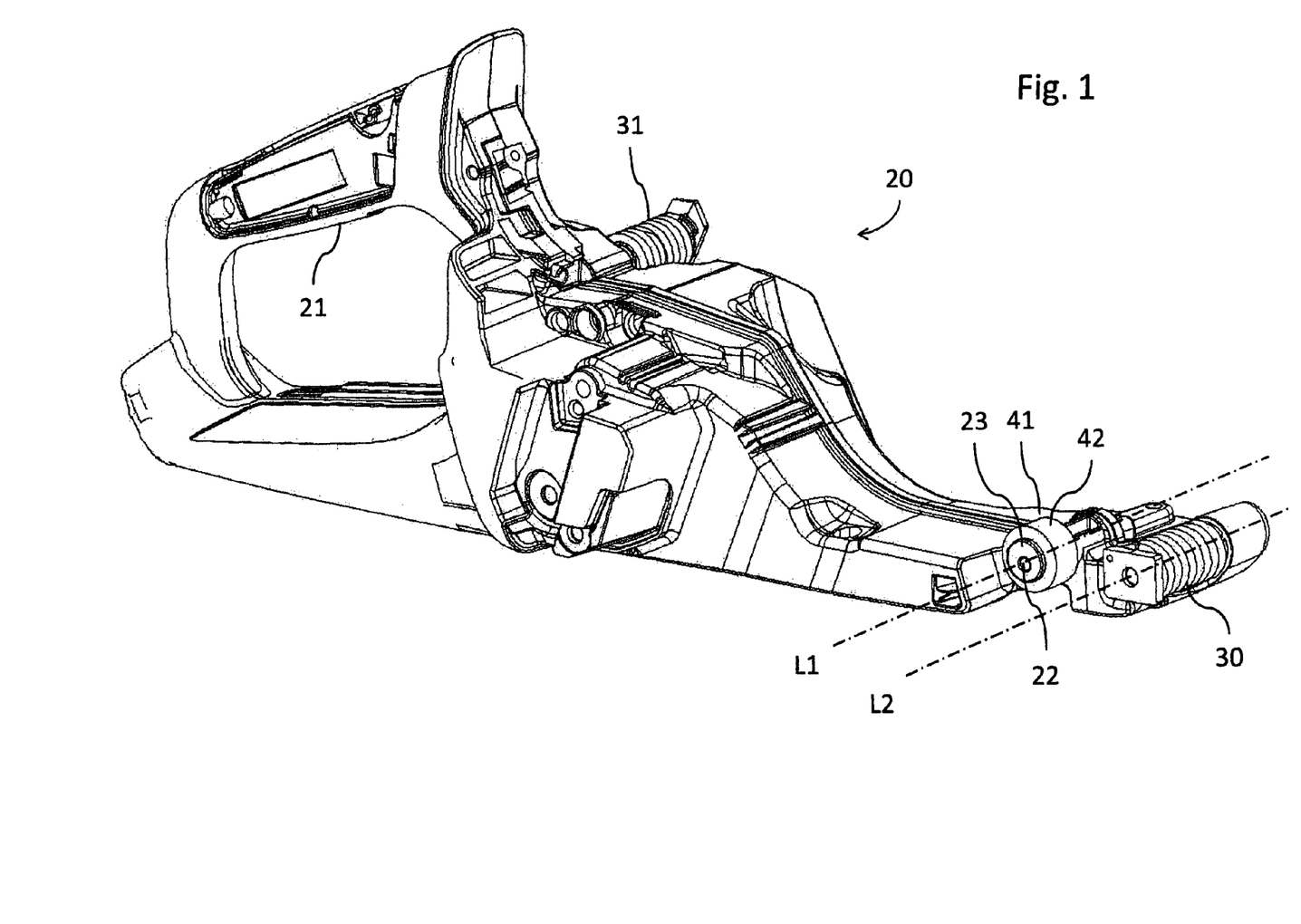
FIG. 1 is a perspective view of the handle part with attached first and second type antivibration elements.

FIG. 1 describes the handle part 20 of the working tool 1 according to the invention in the form of a chain saw. Attached to the handle part 20 are at least two first type antivibration elements 30, 31. These are provided as spring elements, adapted to isolate the handle part 20 from vibrations in the motor part 10. It is preferred that the first type antivibration elements 30, 31 are arranged with as large distance between each other as possible. Thereby is increased stability provided between the handle part 20 and the motor part 10. One first type antivibration element 30 is therefore arranged in a front portion of the handle part 20, closest to the portion of the chain saw wherein the cutting bar is arranged. Another first type antivibration element 31 is arranged in a back portion of the handle part 20, adjacent to the handle grip 21. Further first type antivibration elements may be attached in the back portion of the handle part 20.

Adjacent to the first type antivibration element 30 in the front portion of the handle part 20 is a second type antivibration element 40 arranged. The first type antivibration element 30 and the second type antivibration element 40 are arranged such that their longitudinal axes L1, L2 are in parallel, but separated.

The second type antivibration element 40 comprises a damping element 41 made out of a foamed elastic material. The damping element 41 is attached to the handle part 20 via a holding stick 22. The holding stick 22 is preferably an integrated part of the handle part 20, but may as well be a separate part attached to both the handle part 20 and the damping element 41.

Figure 2:
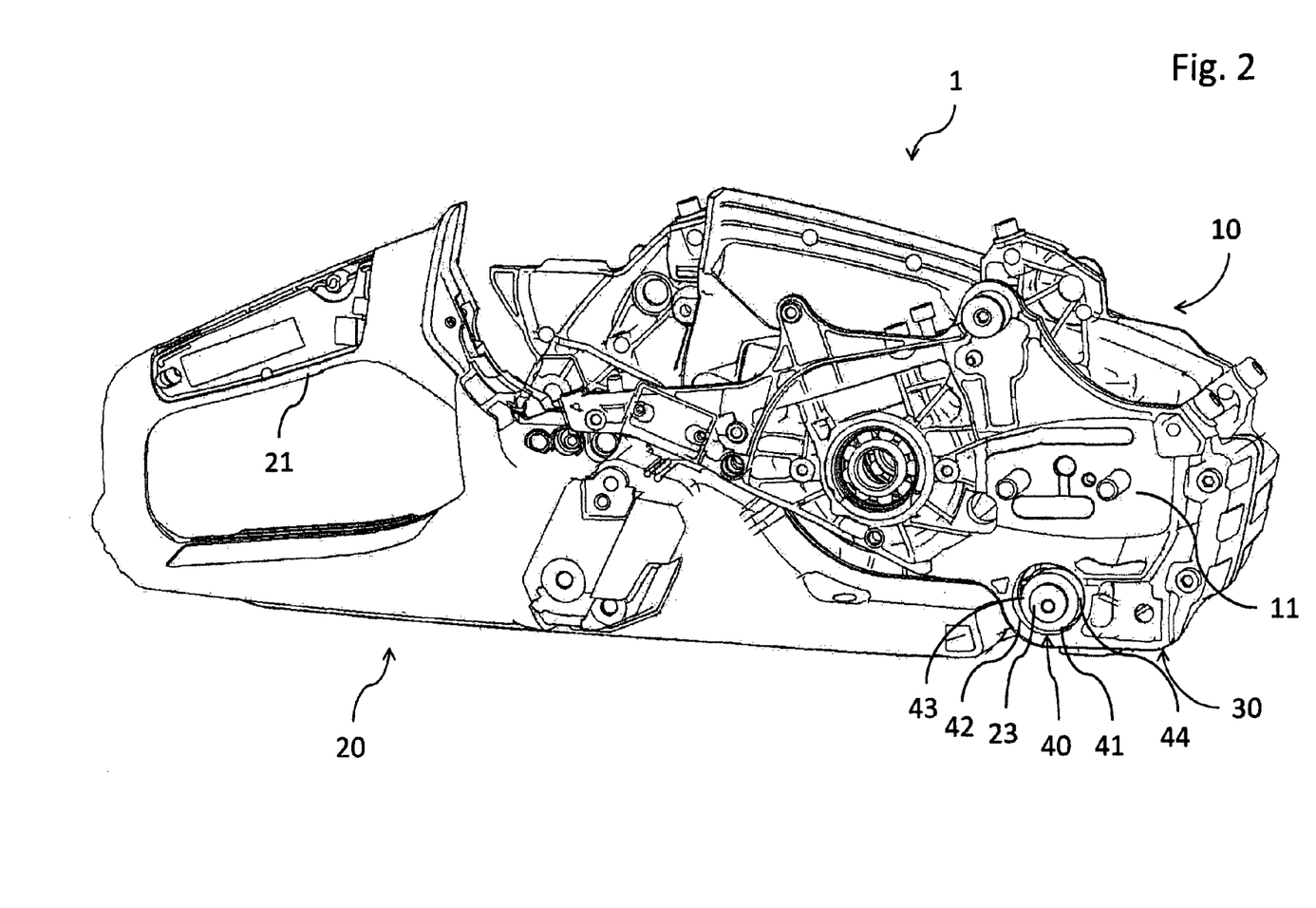
FIG. 2 is a perspective view of the working tool wherein the first and second antivibration elements are arranged in a non-active state.

FIG. 2 describes a working tool 1 according to the invention. The chain saw comprises the motor part 10 and the handle part 20. The first type antivibration element 30 and the second type antivibration element 40 are arranged to prevent vibrations in the motor part 10 from being transferred to the handle grip 21 in the handle part 20.

The damping element 41 in the second type antivibration element 40 is surrounded by a housing 42. The housing 42 is formed as an integrated part in the motor part 10. An inside wall 43 of the housing 42 faces the circular peripheral surface 44 of the damping element 41. When the second type antivibration element 40 is in the non-active state, the damping element 41 is surrounded by the housing 42 with an allowance between the housing wall 43 and the circular peripheral surface 44 all the way around the damping element 41. Hence, there is no contact between the damping element 41 and the housing 42. The allowance is preferably about 2-3 mm. The shape of the housing 42 is round, corresponding to the shape of the damping element 41 and the circular peripheral surface 44. The housing 42 may however be in a more elliptical shape. This would result in an allowance between the damping element 41 and the housing 42 that is different in different directions.

When the chain saw rests, for instance lying on the ground, and the second type antivibration element 40 is in the non-active state, the damping element 41 may not be positioned in the center of the housing 42. When the chain saw is lifted, its own weight may make the damping element 41 to move relative to the housing 42, still in the non-active state.

The cutting bar of the chain saw may be attached to a portion 11 of the motor part 10. The first type antivibration element 30 and the second type antivibration element 40 are arranged adjacent to that portion 11 of the motor part 10.

During operation of the chain saw, the cutting bar gets loaded which provides load on the handle grip 21. The aim of the first type antivibration elements 30, 31 is to isolate the handle part 20 from vibrations in the motor part 10. The best isolation is provided with soft steel springs in the first type antivibration elements 30, 31. But with soft springs the manageability of the chain saw becomes bad during operation, when the cutting bar and the handle grip is loaded. The cutting bar may turn around a longitudinal direction of the cutting bar relative to the handle part 20 when the handle grip 21 becomes loaded. This may make the chain saw feel limp to work with.

Figure 3:
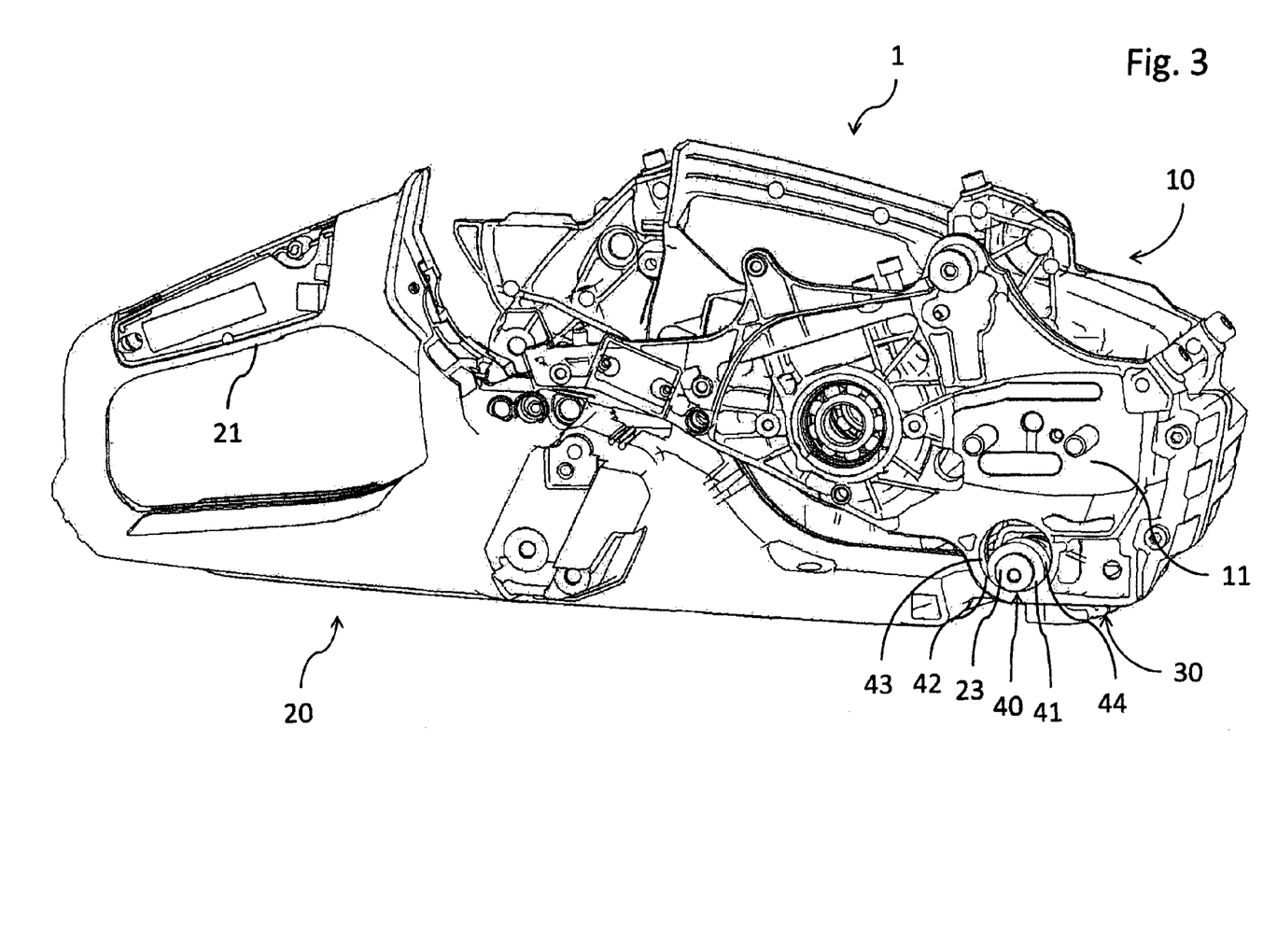
FIG. 3 is a perspective view of the working tool wherein the first and second antivibration elements are arranged in an active state.

To improve the manageability during operation of the chain saw, the damping element 41 in the second type antivibration element 40 is pressed against a portion of the housing wall 43 when the cutting bar is loaded, as described in FIG. 3. This function stabilizes the connection between the motor part 10 and the handle part 20 such that the manageability is improved. The second antivibration element 40 also further isolates the handle part 20 and the handle grip 21 from vibrations in the motor part 10. A portion of the elastic material of the damping element 41 is compressed when it is pressed against the housing wall 43. In the active state, when the damping element 41 is pressed against the housing wall 43, the damping element 41 remains substantially fixed relative to the handle part 20 of the working tool 1.

The damping element 41 is arranged on the holding stick 22 which is attached in one end to the handle part 20. To hold the damping element 41 onto the holding stick 22 in an axial direction, a flange 23 is arranged on the free end of the holding stick 22. The flange 23 has a larger diameter than the holding stick 22, but a smaller diameter than the damping element 41.

The flange 23 also has a function of setting a maximum compression level of the damping element 41. If the material in the damping element 41 is compressed too much when the damping element 41 is pressed against the housing wall 43, the material may be damaged and its flexibility and vibration insulating function may be decreased. It is therefore preferred that the thickness of the material in a radial direction of the damping element 41 is compressed to no less than 30% of its thickness in the non-active state, when pressed to a maximum level against the housing wall 43.

If the part of the holding stick 22 onto which the damping element 41 is arranged has a diameter of 8 mm, and the flange 43 has a diameter of 14 mm, the damping element 41 will have a thickness of 3 mm between the holding stick 22 and the housing wall 43 when pressed to the maximum compression level ((14−8)/2=3 mm). If the thickness of the damping element 41 is of maximum 10 mm in the non-active state, the maximum compression level will be of no less than 30% (3/10=30%). In a preferred embodiment the damping element 41 has a thickness of 8 mm in the non-active state, which results in a maximum compression level of 37% when the flange 23 has a diameter of 14 mm and the holding stick 22 has a diameter of 8 mm.

Figure 4:
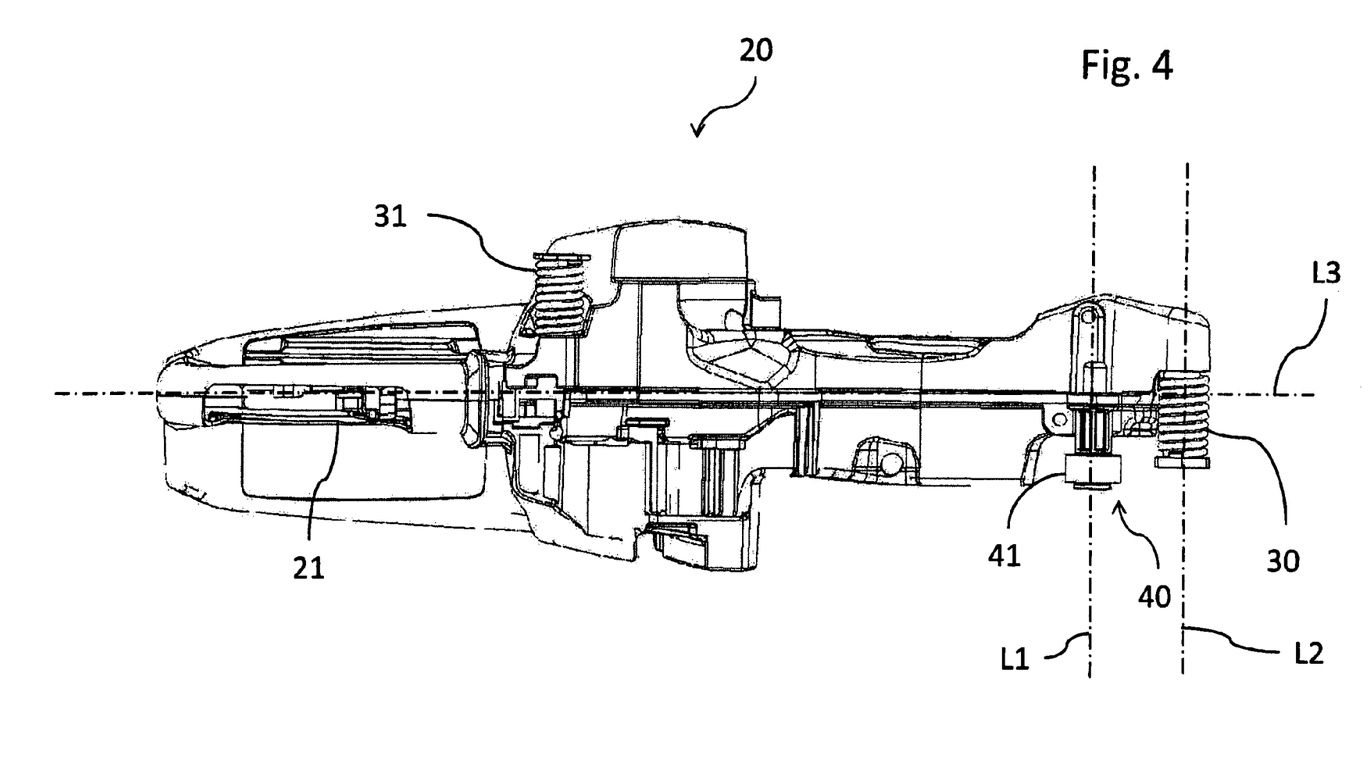
FIG. 4 is a top view of the handle part with attached first and second type antivibration elements.

As described in FIG. 4, the second type antivibration element 40 is arranged on the handle part 20 at a position closer to the handle grip 21 than the position wherein the first type antivibration element 30 is arranged.

Further, the working tool has a longitudinal axis L3 dividing it in two parts as seen from above on the handle part 20 in FIG. 4. The second type antivibration element 40 is arranged on one side of the longitudinal axis L3 of the working tool. That is the same side on which the portion 11 of the motor part 10, to which the cutting bar is attached, is arranged. This provides a close arrangement of the second type antivibration element 40 to the cutting bar. Such arrangement provides better stabilization in the working tool 1 than if the second type antivibration element 40 would have been arranged on the opposite side of the longitudinal axis L3 to the cutting bar. Further such arrangement also provides improved vibration isolation between the handle part 20 and the motor part 10 since softer springs can be used in the first type antivibration elements 30, 31. The second type antivibration element 40 is also arranged further away from the longitudinal axis L3 of the working tool than the first type antivibration element 30.

Figure 5A:
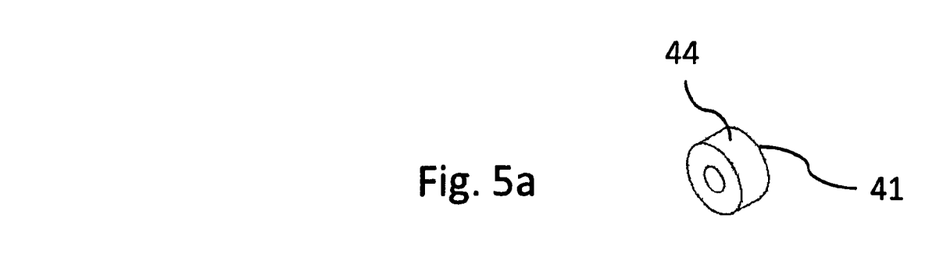
FIG. 5a is a perspective view of the daminge element of the second antivibration element.
Figure 5B:
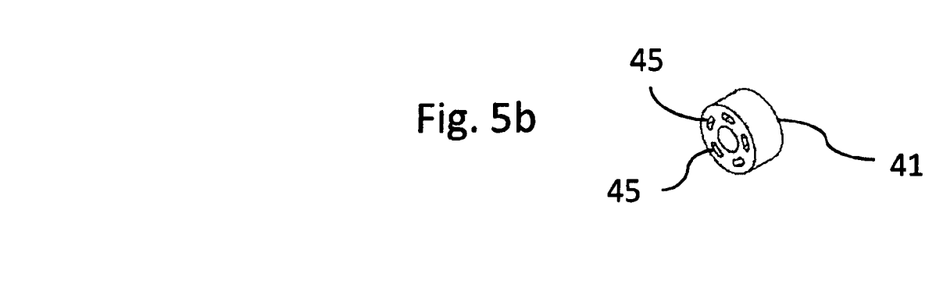
FIG. 5b is a perspective view of the daminge element of the second antivibration element.
Figure 5C:
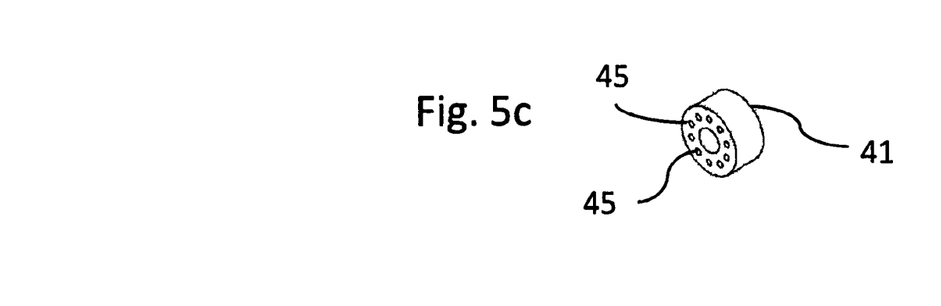
FIG. 5c is a perspective view of the daminge element of the second antivibration element.

As described in FIG. 5, the damping element 41 has a continuous circular peripheral surface 44. The damping element 41 may also be provided with cavities 45 in a longitudinal direction of the damping element 41. The cavities 45 may have a circular (FIG. 5*c*) shape, or an elongated shape in a circumferential direction (FIG. 5*b*). Other shapes are also possible in further embodiments.

The damping element 41 comprises a foamed elastic material, preferably a foamed polyurethane material. The advantage with foamed polyurethane is that it provides a low internal damping and a linear stiffness constant.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A handheld working tool comprising
a motor part including a housing,
a handle part comprising a handle grip, and
at least one first type antivibration element arranged between said motor part and said handle part, which element is adapted to isolate the handle part from vibrations in the motor part,
wherein the working tool further comprises at least one second type antivibration element arranged adjacent to the first type antivibration element, said second type antivibration element is adapted to, when in an active state, prevent vibrations in the motor part from being transferred to the handle grip, in which active state the handle grip is loaded during operation of the working tool, and when in a non-active state, in which non-active state there is no load on the handle grip, the at least one second type antivibration element is free from contact with the housing, and
wherein a longitudinal axis of the second type antivibration element is separated from a longitudinal axis of the first type antivibration element.

2. A handheld working tool according to claim 1, wherein the second type antivibration element is arranged with the longitudinal axis substantially in parallel with the longitudinal axis of the first type antivibration element.

3. A handheld working tool according to claim 1, wherein the working tool further comprises a cutting bar attached to a portion of the motor part, wherein the working tool has a longitudinal axis, and wherein the second type antivibration element is arranged on the same side of the longitudinal axis of the working tool as the portion of the motor part onto which the cutting bar is attached.

4. A handheld working tool according to claim 3, wherein the second type antivibration element is arranged further away from the longitudinal axis of the working tool than the first type antivibration element.

5. A handheld working tool according to claim 1, wherein the first type antivibration element is a spring element.

6. A handheld working tool according to claim 1, wherein the second type antivibration element comprises a damping element, said damping element is surrounded by the housing and arranged to be pressed against a portion of the housing wall when the second type antivibration element is in said active state.

7. A handheld working tool according to claim 6, wherein said damping element is attached to said handle part and said housing is formed in said motor part.

8. A handheld working tool according to claim 6, wherein said damping element is attached to said motor part and said housing is formed in said handle part.

9. A handheld working tool according to claim 6, wherein the damping element provides a substantially circular peripheral surface.

10. A handheld working tool according to claim 6, wherein the damping element is provided with a plurality of cavities.

11. A handheld working tool according to claim 10, wherein the plurality of cavities in the damping element are provided in parallel with the longitudinal axis of the second type antivibration element.

12. A handheld working tool according to claim 6, wherein the damping element comprises an elastic material.

13. A handheld working tool according to claim 12, wherein said elastic material is polyurethane or rubber.

14. A handheld working tool according to claim 6, wherein the working tool further comprises a compression stop adapted to set a maximum compression level of the damping element when the damping element is pressed against the housing wall.

15. A handheld working tool according claim 14, wherein the thickness of the damping element is reduced to no less than 30% of the thickness in the non-active state when the damping element is pressed to the maximum compression level against the housing wall.

16. A handheld working tool according to claim 1, wherein the handheld working tool is a chain saw.

* * * * *